Feb. 5, 1935.  S. GREENBERG  1,989,979
CONTAINER CLOSURE
Filed Feb. 2, 1934
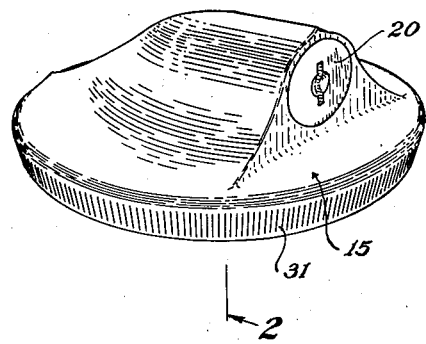
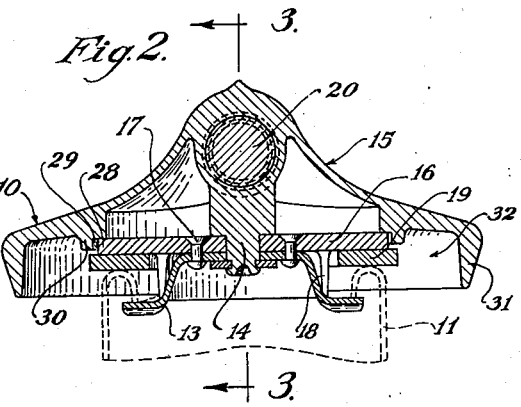
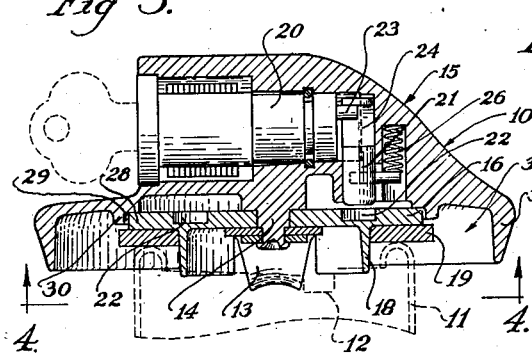
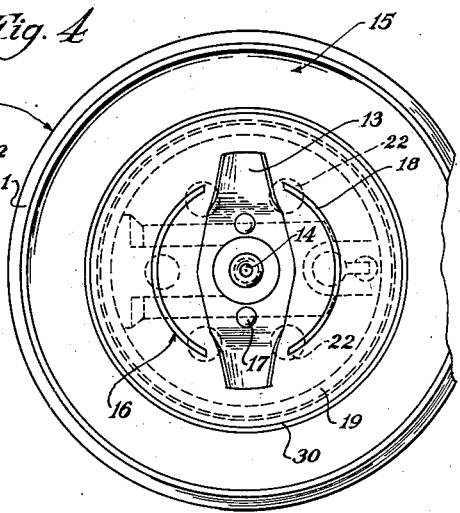
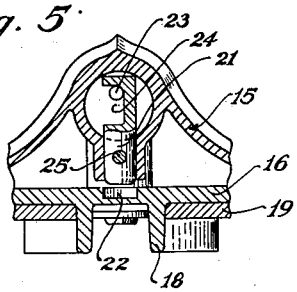
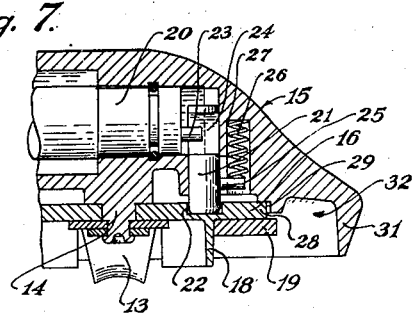
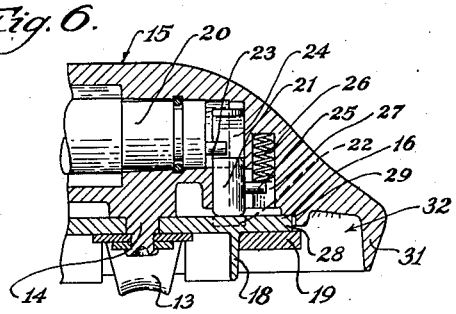
Samuel Greenberg
Inventor
By Threedy and Cannon
His Attorneys Patented Feb. 5, 1935

1,989,979

UNITED STATES PATENT OFFICE 1,989,979

CONTAINER CLOSURE

Samuel Greenberg, Chicago, Ill.

Application February 2, 1934, Serial No. 709,462

4 Claims. (Cl. 70—90)

This invention relates to container closures.

It is an object of this invention to provide an improved container closure which is relatively simple and inexpensive in construction and efficient in use.

Other objects of the present invention are: to provide a closure cap for a tank neck, especially adapted for use on automotive vehicle gasoline or fuel tanks, and which is so constructed that it can not be fraudulently removed to permit theft of the gasoline in the tank.

The new closure comprises a primary inner, or main closure cap or keeper plate and a secondary, supplemental, or outer closure cap which completely encloses the primary or main cap and is swiveled thereto. The top or upper surface of the primary or main cap is provided with an annular row of sockets and a key actuated lock bolt or pin may be lowered into any one of these sockets to lock the two caps together. In this locked relationship of the caps the inner cap may be turned by turning the outer cap and the closure thus removed from the tank neck or nipple. However, when the locking pin or bolt is withdrawn from engagement in its socket, by manipulation of the lock cylinder and associated lock bolt or pin, the inner cap can not be turned by turning the outer cap so that release of the inner cap and removal of the closure from the gasoline tank or nipple are prevented.

In the prior art closure caps of this general character, including that disclosed in my prior application, Ser. No. 552,484, filed July 22, 1931, there exists a serious defect and objectionable feature which resides in the fact that in the prior art closures the inner cap and the outer cap can be wedged together by the fraudulent insertion of a suitable instrument or tool, such as a screw driver, or the like, between the inner cap and the outer cap, so that the two caps may be turned together and the closure thus fraudulently removed from the neck or nipple of the gasoline fuel tank or other container with which it is associated. This may readily be understood by reference to my aforementioned prior application, in which it will be seen that a screw driver or other tool may readily be inserted between the depending flange or skirt of the outer cap 18 and the depending skirt or flange of the inner cap 20, to wedge or lock the two caps fraudulently together; and by reference to the corresponding parts in the other prior art in this field which may be said to be represented by the following United States patents: Thuman, 1,107,376; Freedman, 1,702,205; Kuepfer, 1,714,426; and Morgan, 1,775,318.

It is, therefore, another object of the present invention to provide a closure which will overcome the aforementioned objectionable feature of the prior art closures and which is so constructed that the inner and outer caps can not fraudulently be jammed, wedged, or otherwise fraudulently locked together, by means of a screw driver or any other instrument, nor otherwise fraudulently made to turn together as a unit; thereby necessitating the insertion of the proper key into the lock cylinder and manipulation of the latter to lock the inner and outer caps together so that the closure may be removed from the container with which it is associated.

A further object of the invention is to provide the closure hereinafter described and claimed.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a perspective view illustrating a preferred embodiment of the invention.

Fig. 2 is a vertical sectional view on line 2—2 in Fig. 1;

Fig. 3 is a vertical sectional view on line 3—3 in Fig. 2;

Fig. 4 is a bottom plan view on line 4—4 in Fig. 3;

Fig. 5 is a sectional view on line 5—5 in Fig. 3;

Fig. 6 is a sectional detail view showing the locking bolt or pin raised up above and out of engagement with the sockets in the primary or inner cap; and Fig. 7 is a sectional view, similar to Fig. 6, but showing the lock bolt or pin lowered into and engaged in one of the sockets in the inner cap.

A preferred embodiment of the present invention is generally indicated at 10 in the drawing and, for the purpose of illustrating its uses, the invention is shown associated with the neck or nipple 11 of an automotive vehicle gasoline or fuel tank, although it is understood that this is not to be construed as a limitation upon the uses to which the invention may be put, since the invention may be used in conjunction with any type of container having a neck or nipple on which the new closure may be arranged.

The neck or nipple 11 of the container or tank has an inturned camming flange 12 which is adapted to cooperate with a swinging cross arm or latch member 13, formed as a part of the new closure, to clamp the closure upon, or to release the same from, the tank neck or nipple 11.

This swinging cross arm or latch member 13 is attached by fastening elements in the form of rivets 17, to the main, inner, or primary cap or keeper plates 16 which is swively or rotatably mounted upon a depending, centrally arranged post 14. This post 14 is formed as an integral extension of the outer, secondary, or supplemental casing or cap 15; the inner cap 16 having a depending skirt 18 which is split so that the cross arm 13 may project therethrough. A suitable gasket or washer 19 is fitted onto the skirt 18 as to effect a liquid seal between the upper end of the nipple 11 and the new closure when the latter is in applied position (Fig. 2).

The outer casing or cap 15 contains a key-actuated, rotary lock cylinder or barrel 20 which is operatively associated with a spring-urged locking pin or bolt 21. The locking bolt or pin 21 is adapted to engage in any one of an annular row of sockets 22 which are formed in the upper surface of the primary or inner cap 16; operative connection between the lock bolt or pin 21 and the lock cylinder 20 being effected by a pin and slot arrangement 23—24, the pin 23 being formed as a projection from the inner end of the lock cylinder 20 and the slot 24 being formed in the lock bolt 21.

The lock bolt 21 has a lateral extension or projection 25 which projects through a slot, formed in the outer casing 15, into a chamber 27, also formed in the outer cap 15, and in which chamber is arranged a spring 26 that bears upon the projection 25 to urge the lock bolt 21 against the inner cap 16 and into a predetermined one of the sockets 22 formed therein.

It will be noted that the radially outer or peripheral edge portion 28 of the inner cap 16 (see Figs. 2, 3, 6 and 7) projects into an annular groove 29 that is formed in the bottom surface of the outer cap 15 so that an annular protective rib or guard wall 30 is provided on the inner surface of the outer cap or casing 16. This protective rib or wall 30 encircles the radially outer or peripheral edge of the inner cap or keeper plate 16 and prevents the fradulent insertion of a tool, such as a screw driver, or the like, against the inner cap 16, so that the same can not fraudulently be wedged or otherwise locked to the outer cap or casing 15. Further to insure that the inner cap 16 and the outer cap 15 can not be fraudulently wedged or otherwise locked together by the use of an instrument, such as a screw driver, or other means, the outer cap or casing 15 is provided with a depending annular skirt or protective wall which is spaced radially or laterally a considerable and relatively great distance beyond the radially outer or peripheral edge 28 of the inner cap 16 and its protective wall 30 so that a relatively wide annular space 32 is provided between the radially outer or peripheral edge of the inner cap or keeper plate 16 and the protective skirt 31. This relatively wide annular space 32 makes it practically impossible for a thief to wedge the inner and outer caps together, fraudulently, because even if he should insert a screw driver or other relatively narrow instrument under the protective skirt 31 of the outer cap 15 he will be unable to wedge such instrument between the inner cap 16 and the outer cap 15 due to the relatively wide space 32 and the protective wall 30. It is, therefore, impossible to wedge or otherwise fraudulently lock the inner cap 16 and the outer cap 15 together, with the intent that they may be turned together as a unit and removed from the tank neck or nipple 11; an operation which necessitates that the operator possess the proper key for the cylinder 20 so that the latter may be rotated to dispose the lock bolt or pin 21 in a preselected one of the sockets 22 in the inner cap 16 whereupon the inner cap 16 and the outer cap 15 may be turned together and the closure removed from the nipple or tank neck 11; it being understood that in the present closure device the outer cap or casing 15 is freely rotatable independently of the inner cap when the key is withdrawn from the lock cylinder 20 so that the closure can not be fraudulently removed by rotating the outer cap or casing 15 unless the proper key is first inserted into the lock cylinder 20 and the latter rotated to lower the pin 23 thereby permitting the lock bolt or pin 21 to drop, under the action of the spring 26, into one of the sockets 22 formed in the inner cap 26.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A container closure, comprising: an outer cap or casing having an annular groove formed in its inner or bottom surface; an inner cap swively connected to the said outer cap and rotatable in said groove; the said inner cap having means associated therewith for detachably attaching the same to the neck or nipple of a container; and the said closure including key-actuated means for releasably attaching the said caps together so that they may be manipulated as a unit; the said outer cap having an annular protective wall, provided by the formation of said groove, and said wall encircling the radially outer or peripheral edge of the said inner cap; the said outer cap being provided with a depending annular flange or skirt; said skirt encircling said wall on the radially outer side thereof and being spaced laterally or radially a considerable distance therefrom so that a relatively wide annular space is provided between said wall and said skirt.

2. A container closure, comprising: an outer cap or casing; an inner cap swively connected to said outer cap; the said inner cap having means associated therewith for detachably attaching the same to the neck or nipple of a container and the said outer cap having key-actuated means associated therewith adapted to cooperate with said inner cap to releasably lock said caps together so that they may be turned together as a unit; said outer cap substantially enclosing said inner cap and being provided with an annular wall encircling the peripheral edge of said inner cap in close proximity thereto; and said outer cap being provided with a second wall encircling said first-named wall at a considerable distance laterally or radially therefrom.

3. A container closure, comprising: an outer cap or casing; an inner cap swively connected to said outer cap; the said inner cap having means associated therewith for detachably attaching the same to the neck or nipple of a container and the said outer cap having key-actuated means associated therewith adapted to cooperate with said inner cap to releasably lock said caps together so that they may be turned together as a unit; said outer cap substantially enclosing said inner cap and being provided with concentric annular walls encircling the peripheral edge of said inner cap, one in close proximity thereto and the other at a considerable distance radially therefrom.

4. A container closure, comprising: an outer cap or casing; an inner cap swivelly connected to said outer cap; the said inner cap having means associated therewith for detachably attaching the same to the neck or nipple of a container, and the said outer cap having key-actuated means associated therewith adapted to cooperate with said inner cap to releasably lock said caps together so that they may be turned together as a unit; said outer cap substantially enclosing said inner cap and being provided with an annular wall encircling the peripheral edge of said inner cap in close proximity thereto; and the said outer cap having an annular skirt encircling said annular wall and the said peripheral edge of said inner cap and extending downwardly below the same.

SAMUEL GREENBERG.